United States Patent
Robert et al.

(10) Patent No.: US 9,136,955 B2
(45) Date of Patent: Sep. 15, 2015

(54) METHOD OF RESENDING DIGITAL SIGNALS

(75) Inventors: Jean-Luc Robert, Betton (FR); Philippe Gilberton, Geveze (FR); Jean-Yves Le Naour, Pace (FR)

(73) Assignee: Thomson Licensing (FR)

( * ) Notice: Subject to any disclaimer, the term of this patent is extended or adjusted under 35 U.S.C. 154(b) by 0 days.

(21) Appl. No.: 13/381,229

(22) PCT Filed: Jun. 30, 2009

(86) PCT No.: PCT/EP2009/058176
§ 371 (c)(1),
(2), (4) Date: Dec. 28, 2011

(87) PCT Pub. No.: WO2011/000410
PCT Pub. Date: Jan. 6, 2011

(65) Prior Publication Data
US 2012/0114071 A1   May 10, 2012

(51) Int. Cl.
H04L 27/00 (2006.01)
H04H 20/08 (2008.01)
H04B 7/155 (2006.01)
H04H 20/63 (2008.01)

(52) U.S. Cl.
CPC ............ *H04H 20/08* (2013.01); *H04B 7/15542* (2013.01); *H04H 20/63* (2013.01)

(58) Field of Classification Search
CPC ... H04B 7/15542; H04H 20/08; H04H 20/63; H04L 1/0071; H04L 5/0007; H04L 1/0009; H04L 27/0008
USPC .................................................. 375/295, 296
See application file for complete search history.

(56) References Cited

U.S. PATENT DOCUMENTS

| | | | |
|---|---|---|---|
| 4,079,415 A | 3/1978 | Will | |
| 4,499,602 A | 2/1985 | Hermeling et al. | |
| 4,569,084 A | 2/1986 | Takahama | |
| 5,014,349 A | 5/1991 | Kubo et al. | |
| 5,093,922 A | 3/1992 | Kubo et al. | |
| 6,728,523 B1 | 4/2004 | Ohba et al. | |

(Continued)

FOREIGN PATENT DOCUMENTS

| BE | 848283 | 3/1977 |
|---|---|---|
| CA | 1206281 | 6/1986 |

(Continued)

OTHER PUBLICATIONS

Anonymous, "DVB-H Small Gap fillers Task-Force—Technical and Commercial Feasibility Study", Jul. 4, 2006, pp. 1-57.

(Continued)

*Primary Examiner* — Zewdu Kassa
(74) *Attorney, Agent, or Firm* — Jack Schwartz & Associates, PLLC

(57) ABSTRACT

The invention relates to a method of resending at least one digital signal, comprising a step of reception by cable of the signal comprising signaling information, a step of resending of this signal at a resend frequency by an antenna, and also comprising a step of selecting the resend frequency as a function of the signaling information; a step of transposing the signal into the selected frequency of the resend signal and a step of monitoring and adjusting the frequency of the resend signal as a function of the selected frequency of the resend signal.

10 Claims, 4 Drawing Sheets

(56) References Cited

U.S. PATENT DOCUMENTS

| | | |
|---|---|---|
| 2002/0039393 A1* | 4/2002 | Shibata et al. ............ 375/316 |
| 2004/0139477 A1 | 7/2004 | Russell et al. |
| 2004/0153766 A1* | 8/2004 | Yamamoto et al. .......... 714/18 |
| 2004/0160928 A1 | 8/2004 | Perlman |
| 2005/0183126 A1 | 8/2005 | Murao et al. |
| 2006/0101501 A1 | 5/2006 | Orbach et al. |
| 2006/0271966 A1 | 11/2006 | Staal et al. |
| 2007/0037512 A1 | 2/2007 | Godwin |
| 2007/0061861 A1 | 3/2007 | Strull et al. |
| 2007/0191071 A1 | 8/2007 | Spampinato et al. |
| 2008/0036550 A1* | 2/2008 | Yu ............................... 331/179 |
| 2009/0239529 A1* | 9/2009 | Fenech et al. .............. 455/427 |

FOREIGN PATENT DOCUMENTS

| | | |
|---|---|---|
| CA | 2383655 | 1/1999 |
| DE | 3604545 | 7/1987 |
| DE | 19609811 | 8/1996 |
| EP | 0072698 | 2/1983 |
| EP | 0394772 | 10/1990 |
| EP | 1026885 | 8/2000 |
| EP | 1071286 | 1/2001 |
| EP | 1505731 | 2/2005 |
| EP | 1670150 | 6/2006 |
| EP | 1670151 | 6/2006 |
| EP | 1670251 | 6/2006 |
| EP | 1681857 | 7/2006 |
| EP | 1744471 | 1/2007 |
| FR | 2530394 | 1/1984 |
| GB | 1117258 | 6/1968 |
| GB | 1555203 | 11/1979 |
| GB | 1561544 | 2/1980 |
| JP | 50040120 | 4/1975 |
| JP | 5761343 | 4/1982 |
| JP | 5895433 | 6/1983 |
| JP | 6024736 | 2/1985 |
| JP | 1143526 | 6/1989 |
| JP | 10313258 | 11/1998 |
| JP | 11317715 | 11/1999 |
| JP | 2001244866 | 9/2001 |
| JP | 2003152562 | 5/2003 |
| JP | 2003333003 | 11/2003 |
| JP | 2005236448 | 9/2005 |
| JP | 2005295172 | 10/2005 |
| JP | 2006074270 | 3/2006 |
| JP | 2008/066803 | 3/2008 |
| JP | 2009027618 | 2/2009 |
| KR | 910000307 | 1/1991 |
| KR | 2004034217 | 4/2004 |
| KR | 2004064309 | 7/2004 |
| KR | 2006079503 | 7/2006 |
| KR | 2007000617 | 1/2007 |
| KR | 2007016569 | 2/2007 |
| KR | 2007032407 | 3/2007 |
| KR | 20080076359 | 8/2008 |
| NL | 6514703 | 5/1966 |
| NL | 7703657 | 4/1976 |
| WO | WO8906072 | 6/1989 |
| WO | WO0147261 | 6/2001 |
| WO | WO2008100046 | 8/2008 |
| WO | WO2009/003845 | 1/2009 |

OTHER PUBLICATIONS

Pressnell, R., "TV gap-filling transmitters installation", Electronic Technology, vol. 14, No. 9, Oct. 1980, pp. 206-209.

Irmer et al., "Combined amplifier technique for vision and sound in medium power television transmitters", Electrical Communication, vol. 47, No. 3, 1972, pp. 169-174.

* cited by examiner

METHOD OF RESENDING DIGITAL SIGNALS

This application claims the benefit, under 35 U.S.C. §365 of International Application PCT/EP2009/058176, filed Jun. 30, 2009, which was published in accordance with PCT Article 21(2) on Jan. 6, 2011 in French.

BACKGROUND OF THE INVENTION

1. Field of the Invention

The invention concerns the retransmission of digital signals received jointly by cable or RF transmission in a domestic setting. It applies primarily to digital terrestrial television and retransmission to mobile televisions.

2. Description of Related Art

Digital terrestrial television signals are transmitted primarily by way of microwave radio systems In most countries. But some countries also use cable distribution systems and therefore want to multiplex the channels from their cable network and those from the RF channels to increase the mobile television penetration rates in homes, For example Belgium, 95% cabled, is one of these countries potentially interested in joint retransmission for mobile television.

Currently to receive mobile television under good conditions on one's portable or mobile terminal at home, a television channel retransmitter previously connected to the home's roof antenna is used, This retransmitter is installed in the home. Thus only the television channel, received by the roof antenna, will be amplified and then transmitted at the same frequency for improved interior reception, This involves an isofrequency retransmission, Other than in the case of joint distribution by radio relay channel and by cable, the TV channel frequency is not necessarily the same by cable or by radio relay channel Consequently, there are disturbances that hinder the proper functioning of the terrestrial broadcasting network.

Seen from the mobile TV terminal, this variance can be compared to the Doppler effect. However, it should be noted that unlike the Doppler effect, the variation in time of this variance will be practically nil because the reception is in fixed mode.

The state of the art, represented by FIG. 1, uses an isofrequency retransmitter locked to the frequency of the television channel to retransmit.

This retransmitter is based on a double frequency transposition on the uplink and the downlink such that the signal is transmitted on the frequency of the memorised tuner channel, The frequency offset related to the double change of upstream and then downstream frequency auto-compensates by adding and then subtracting the same frequency deviation. The different selective bandwidth filters used to isolate the channel to be retransmitted have severe out-of-band rejection constraints that tolerate little frequency offset, For example, FIG. 3 presents the out-of-channel transmission spectral mask of a relay transmitter on the DVB_H standard for a channel frequency band of 8 MHz.

Therefore, on the input terminal of this retransmitter, represented in FIG. 1, the Rfin signal is transmitted by cable, A SW1 switch in the first position is used to provide a direct connection between this terminal, a tuner T element, then a demodulator D and then a microprocessor P so as to determine the frequency of the transmission channel. A transmitting frequency memorised in the memory M corresponds to this signal channel received, Thus the microprocessor sends a control signal to the first local oscillator OL1, which allows a transposition at this memorised frequency.

Since the channel has been determined, the switch SW1 moves to the second position and the signal is transposed twice in an uplink and a downlink by the M1-M4 mixers combined with the oscillators OL1 and OL2, filtered by the different RF and IF filters, F1-F5, and amplified by the amplifiers A1 and A2 with variable gain control CAG controlled by the processor. The signal transposed to the memorised transmitting frequency and corresponding to the input channel is transmitted on the output antenna, A safety switch SW2 controlled by the microprocessor can be used to interrupt the transmission when errors are detected.

For example, by assuming an oscillator TCXO of 1 ppm of frequency drift and a frequency change of 100 MHz, drawing 2 shows an estimate of the maximum Doppler frequency deviation for a mobile television signal transmitted on the DVB_H standard and accepted by a terminal equipped with the latest generation digital demodulator.

In this FIG. 2, it should be noted that for a DVB_H type transmission as represented by the curve C1, based on a maximum frequency derivation value of 191 Hz, corresponding to a signal-to-noise ratio of 22 dB, the demodulator blacks out and no longer operates.

By way of comparison, a Rayleigh type fixed propagation channel would only require a signal-to-noise ratio of 11.2 dB, at the same error rate, The choice of the Doppler frequency value of 100 Hz, which corresponds approximately to a signal-to-noise ratio of 19 db, is therefore adopted as the correction limit for this Doppler effect.

The choice of the 100 Hz value takes into account an additional implementation margin.

Consequently, when the frequency change is less than or equal to 100 MHz, the receiver can diversity receive 2 DVB_H signals whose channel frequency will be offset by a frequency less than 100 Hz and therefore correctly managed by most receivers.

However, if the frequency change is greater than 100 MHz, a traditional frequency transposition approach would require either a precise OCXO type reference oscillator or an automatic frequency control system (AFC). But this oscillator or system are bulky, quite expensive and incompatible with mass production.

The patent EP 1744471 describes another isofrequency retransmission system and the associated process. This patent deals with isofrequency retransmission systems also called "gap filler" systems, whose main function is to receive the signal from a main transmitter on a receiving antenna and then to retransmit this signal at the same frequency to the zone to be covered by a transmitting antenna. This patent includes a retransmission technique by subtraction, which has the effect of cancelling the coupling echo caused by the transmitting antenna and the guarantee of improved signal retransmission conditions.

Even though this technique is an isofrequency retransmission technique, it can be used to correct deformations related to coupling and not those related to a frequency offset comparable to a Doppler effect.

BRIEF SUMMARY OF THE INVENTION

The objective of the invention is to overcome these disadvantages,

The invention involves a retransmission process with at least a p digital signal including a step to receive the signal by cable with the signaling information (TPS) and a step to retransmit this signal at a retransmission frequency by antenna (A).

The process includes a step to select the retransmission frequency based on the signaling information, a step to transpose the signal into the selected retransmission signal frequency and a step to control and adjust the retransmission signal frequency based on the selected retransmission signal frequency.

In particular, the invention has the advantage of controlling the mobile TV channel retransmission frequency of the transmitter based on the incoming frequency for this same channel on a cable network, Preferentially the TPS signaling information includes, associated with the receiving channel, a receiving frequency and a retransmission frequency.

In a form of embodiment, the signal transposition step is done using local oscillators (OL1, OL2) and an additional switched local oscillator OL3, if the retransmission is not isofrequency.

According to a variant of the invention, the step to control and adjust the retransmission signal frequency includes a step to synchronise the local oscillators by a voltage controlled VCXO oscillator.

The invention also concerns a system to retransmit a signal received in a channel including means to determine the retransmission frequency based on the incoming feed channel, a frequency conversion circuit to transpose into a frequency the signal received from a channel into a retransmission signal at a retransmission frequency using at least one local oscillator, Moreover, it includes an automatic frequency compensation system with an additional local oscillator (OL3) for:

means of selecting (SW3) the local oscillators necessary to transpose the signal, and means of controlling the retransmitted signal frequency based on the determined and measured frequency of the retransmitted signal.

Preferentially, the means of automatically compensating the retransmitted signal frequency include a local reference oscillator that can be used to synchronise the different local oscillators.

According to a variant of the invention, the signal is received by cable and retransmitted to a retransmission antenna by radio relay channel.

In another form of embodiment, the means of controlling the retransmitted signal frequency based on the determined and measured frequency of the retransmitted signal include:

a coupler to sample the retransmitted signal; a comparison element (p) between the measured frequency and the determined frequency of the retransmitted signal and a control element (VCXO) for the different local oscillators (OL1-OL3),

BRIEF DESCRIPTION OF THE DRAWINGS

The characteristics and advantages of the aforementioned invention, as well as others, will appear clearer on reading the following description, in conjunction with the attached drawings, in which.

DETAILED DESCRIPTION OF THE INVENTION

Figure 1:
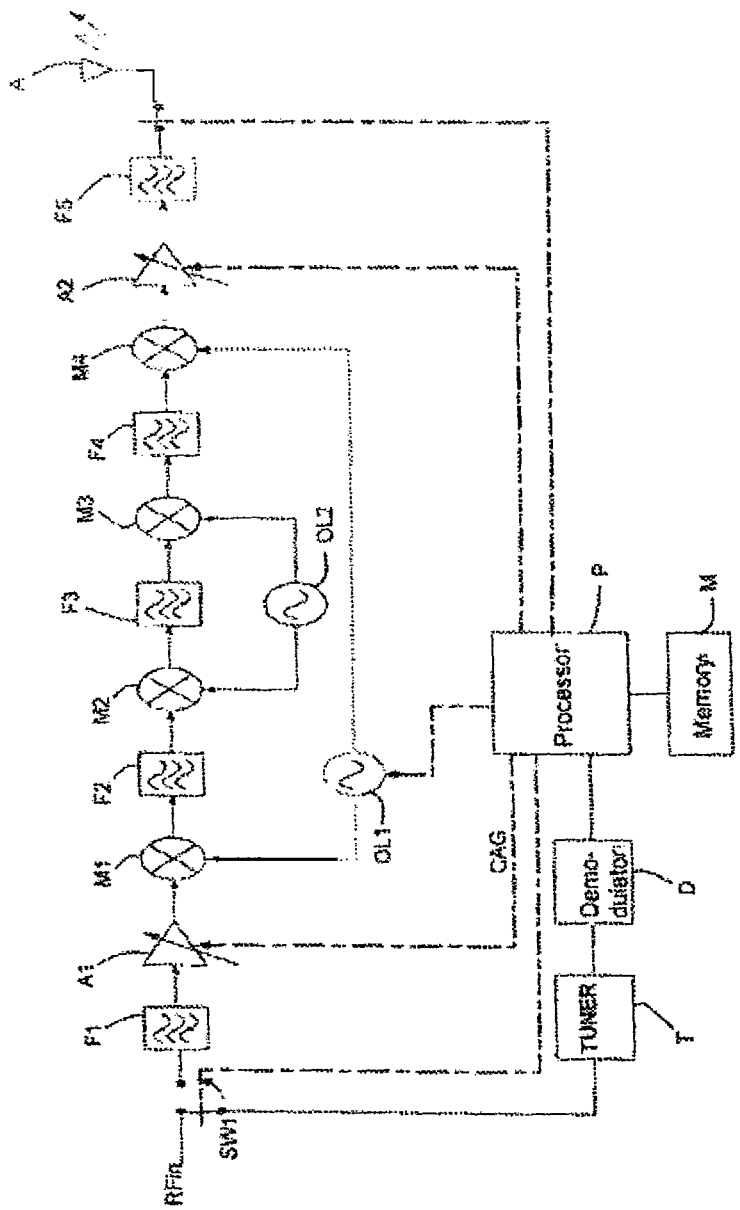
FIG. 1 already presented in relation to the prior art illustrates a prior art isofrequency retransmitter.
Figure 2:
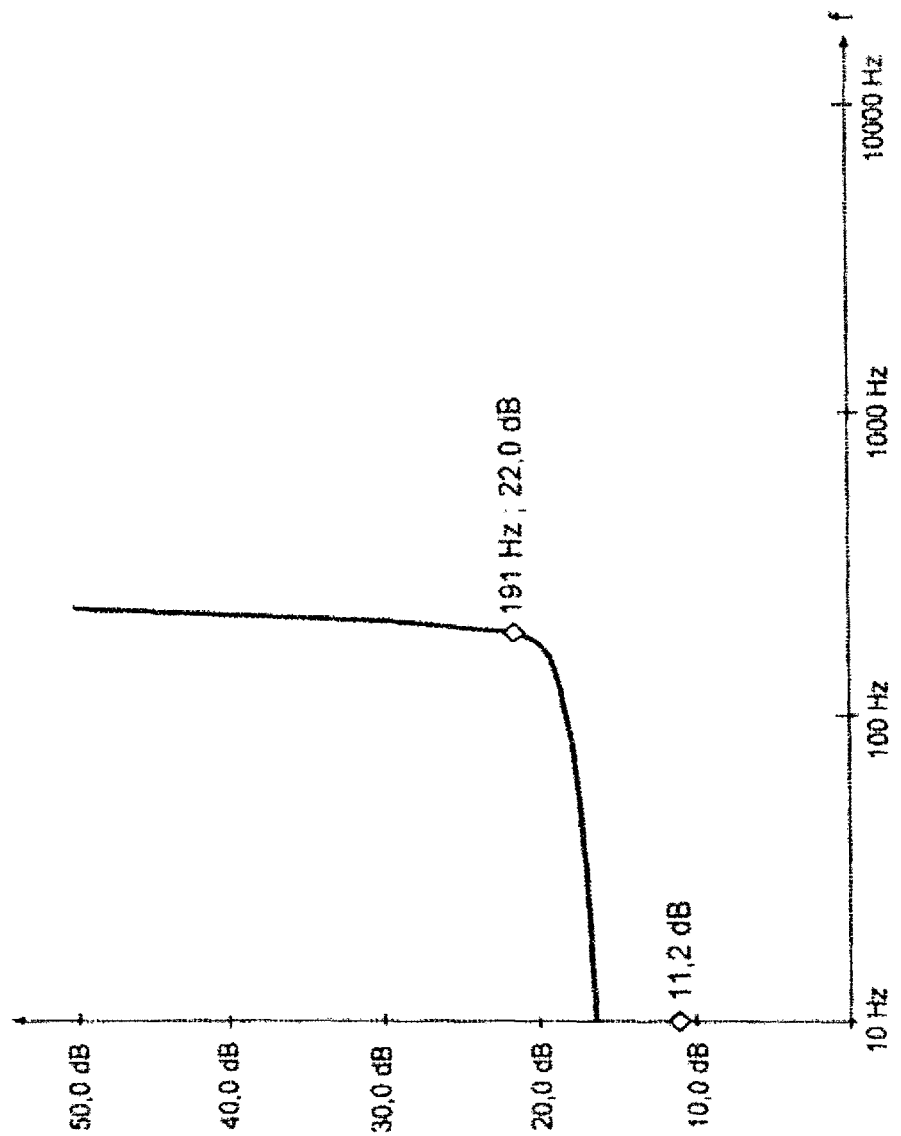
FIG. 2 is a diagram representing an estimate of the Doppler variance in DVB-H mode.
Figure 3:
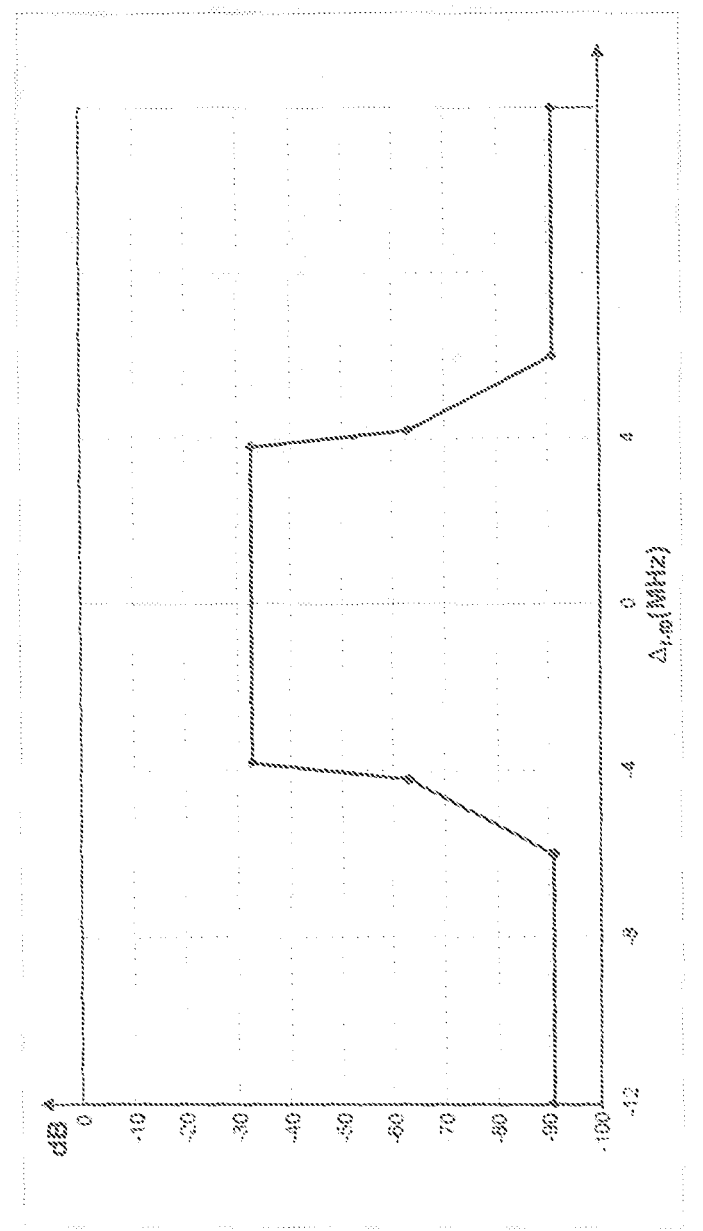
FIG. 3 represents an out-of-channel DVB-H transmission spectral mask.
Figure 4:
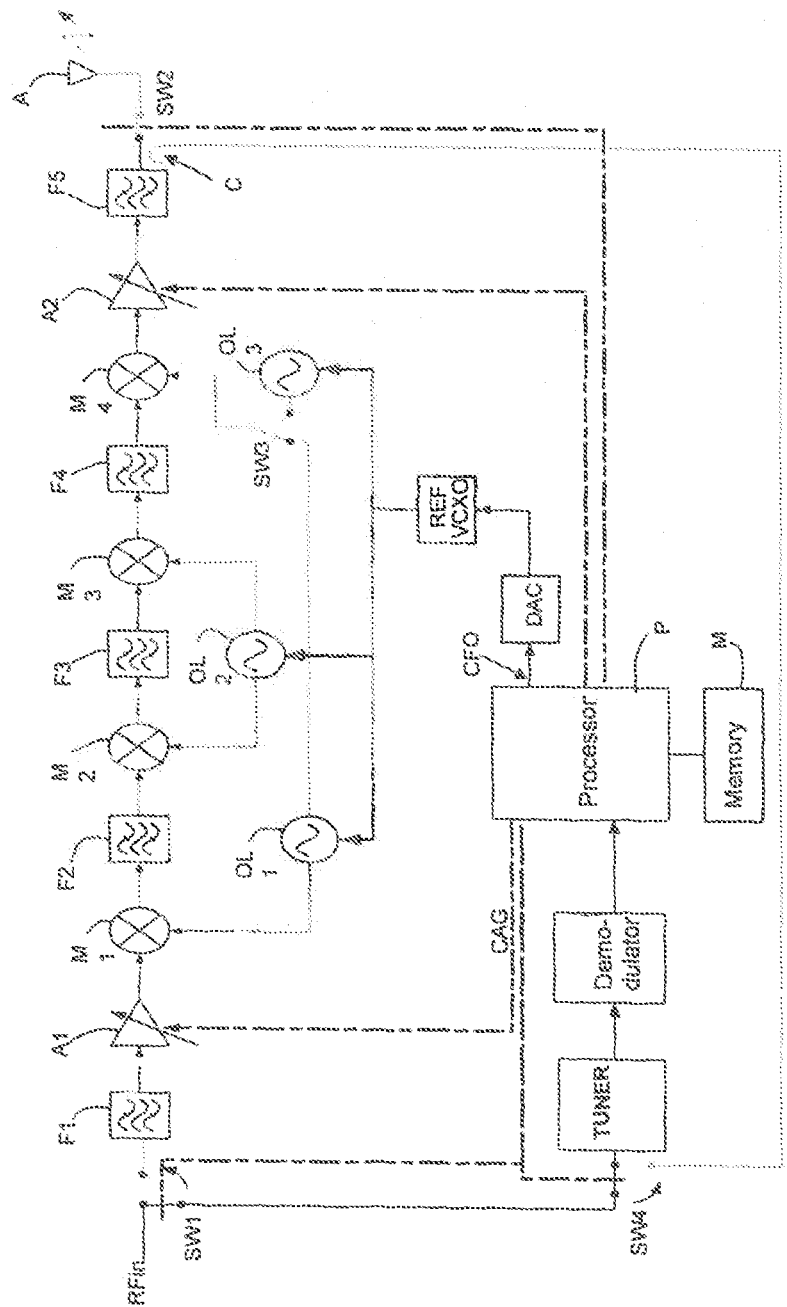
FIG. 4 illustrates a frequency retransmitter according to the invention.

To simplify the description, the same references will be used in these latest drawings to designate the elements fulfilling identical functions.

Therefore, the principle of the invention is based on the retransmission of a mobile television signal that will also take into consideration a potential frequency offset compared to the transmission channel frequency. This offset, comparable to the Doppler effect, will not vary over time because it involves a reception in fixed mode.

In comparison to the state of the technique system represented and described by drawing 1, this system according to the invention, represented by drawing 4, differs by the addition of a coupler C used to sample the outgoing signal to be transmitted in order to compare it with the parameters from the incoming signal and an automatic frequency compensation system, to minimise the offset between the transmitted signal and the allocated frequency.

This automatic frequency compensation system is based on the switching of an additional oscillator OL3 by a switch SW3, which allows the detected frequency deviation to be transposed into an offset frequency.

To make it easier to understand this system according to the invention, different steps of the retransmission process will be described:

First Step:

In this automatic frequency compensation system, a first switch SW1 with 2 positions is used to switch the incoming RF signal either to the frequency change circuit or to the incoming RF signal control circuit of the cable network, This switch SW1 and the other switches SW2, SW3 and SW4 are all controlled by the microprocessor.

The first step involves positioning the switch SW1 on the RF signal control circuit and the switch SW4 on the cable signal to determine the frequency of the channel received by the cable network. This control circuit includes a cable tuner T covering the download cable bandwidth (e.g.; 108-862 MHz). This tuner is connected to a mobile television demodulator D (e.g.; DVB-H) so that only the channels on the DVB-H standard from 470 to 750 MHz are demodulated and not the other channels on the DVB-C standard.

Like this the tuner will be tuned (frequency scanned) by the microprocessor P on all possible channels in this frequency band and the mobile television channels detected like this with their related frequencies will be put in memory M.

Once locked on a mobile television channel, the demodulator restores the signal (e.g.: a flow of MPEG2-TS data), for which the microprocessor will extract, for example, TPS (Transmission Parameter Signalling) signals, the frequency of the channel transmitted in the cable, still called "frequency of the cable channel" and the frequency of the RF channel to transmit as outgoing RF from the retransmitter, still called "frequency of the RF channel." These two pieces of frequency information are also stored in the memory M.

The incoming signal is also analysed as a signal-to-noise ratio or as a binary error rate to control its quality. This incoming signal control is important in order to avoid transmitting a channel at the wrong frequency or with an insufficient signal-to-noise ratio. For example, if the tuned frequency put in the memory is different than the frequency read in the TPS signal, this means that there is a problem on the network or on the control circuit. In this case the retransmitter will be put in standby mode by the opening of the switch SW2, Likewise, if the "signal-to-noise" ratio or "binary error rate" is insufficient, the retransmitter will be put on standby in the same way.

Second Step:

Next, since the incoming RF signal has been controlled and validated, the switch SW1 is then positioned in its second position, towards the frequency change circuit. The microprocessor takes control of the switch SW3 and the oscillators OL1 and OL3 to retransmit the incoming mobile television signal on the frequency of the RF channel indicated in the TPS The second step is dependent on the frequencies of the cable channel received and the RF channel transmitted.

In effect, if the cable channel frequency is already in the UHF frequency band (channels 21 to 69, frequencies 474 to 862 MHz) and the cable channel frequency equals the RF channel frequency, frequency deviations are auto-compensated and the local oscillator OL1 is active for the last transposition. The oscillator OL3 is inactive.

Consequently, the switch SW3 is in the position OL1 so that the oscillator OL1 is connected to the mixer M4 to carry out the last transposition.

If the cable channel frequency is already in the UHF frequency band, but the cable channel frequency is different than the frequency of the RF channel, the microprocessor controls the frequency of the first oscillator OL1 to increase the frequency to 1220 MHz, the switch SW3 is switched to the position OL3 and the oscillator OL3 is connected to the mixer M4 to carry out the last transposition. The microprocessor controls the frequency of oscillator OL3 to decrease the frequency, while respecting the frequency of the transmission RF channel given by the parameters of the signal received (e.g.; TPS).

If the frequency of the cable channel is not in the UHF frequency band, then the microprocessor will control separately the oscillators OL1 and OL3 in the same way as before: the microprocessor controls the frequency of the first oscillator OL1 to increase the frequency to 1220 MHz, the switch SW3 is switched to the position OL3 and the oscillator OL3 is connected to the mixer M4 to carry out the last transposition. The microprocessor controls the frequency of oscillator OL3 to decrease the frequency, while respecting the frequency of the transmission RF channel given by the parameters of the signal received (e.g.; TPS).

Third Step:

Once this step is completed, a control step is carried out. The switch SW4 will switch to the outgoing signal via the coupler, since the switch SW1 is positioned towards the frequency changing circuit.

Like this the frequency actually transmitted and demodulated via the coupler C will be compared with the transmission RF channel frequency stored in the memory. If these frequencies are different, the microprocessor places the retransmitter on standby by opening the switch SW2.

If these frequencies are equal, the outgoing amplifier and the switch SW2 are configured by the microprocessor in on mode, Then to minimise the frequency offset of the signal transmitted, which must typically remain les than 100 Hz throughout the retransmission frequency band, the microprocessor will then process the Carrier Frequency Offset CFO information given by the demodulator, which is converted into analogue data by a digital-to-analogue converter (CDA). The output voltage delivered is a control voltage from a reference oscillator VCXO in the system of local oscillators OL1, OL2 and OL3. The frequency of the oscillator VCXO is therefore automatically and periodically controlled, as well as the frequency of the different local oscillators to ensure the frequency offset is less than 100 Hz, for example.

By way of example, this system operates with filters F1-F5 and local oscillators OL1-OL3 with the following values:

F1: 370-862 MHz bandwidth filter; F2: RF SAW 1220 MHz filter, F3: IF SAW 36 MHz filter; F4: RF SAW 1220 MHz filter and F5: 470-862 MHz bandwidth filter.

Local oscillator OL1: 1594-2078 MHz; Local oscillator OL2: 1184 MHz and Local oscillator OL3 1694-2078 MHz.

This mobile TV retransmitter is based on the standard ETSI: "Technical Specifications for DVB-H Small Gap Fillers."

The invention applies to any other mobile television standard that would be multiplexed to the cable network of the country concerned (e.g.; to send the L band to the United States and in Europe).

An RF or infrared remote control system can be implemented beneficially in the system so the user can choose his mobile TV programme among the frequency multiplexes available on the cable network, In this scenario the relay transmitter will change the corresponding frequency based on the information transmitted by the remote control system.

The architecture of the retransmitter can vary depending on the degree of complexity and cost of the designer, but the management principle for frequency change circuits described in this patent application and known by a person skilled in the art will remain unchanged.

The invention claimed is:

1. A retransmission process for a digital signal received in a receiving channel comprising
   receiving the digital signal with the signaling information of the digital signal;
   retransmitting the digital signal at a retransmission frequency
   selected based on the received signaling information of the digital signal;
   transposing the digital signal into a transposed digital signal to be retransmitted at the selected retransmission frequency; and
   controlling and adjusting the retransmission frequency of the transposed digital signal to be retransmitted based on the retransmission frequency of the transposed digital signal with respect to the selected retransmission frequency.

2. The retransmission process according to claim 1, wherein the signaling information includes, associated with the receiving channel, a receiving frequency and the retransmission frequency.

3. The retransmission process according to claim 1, wherein the transposing step is done using local oscillators and an additional switchable local oscillator, the additional local oscillator being switched to operate where the retransmission frequency of the transposed digital signal does not match the selected retransmission frequency.

4. The retransmission process according to claim 3, wherein controlling and adjusting the retransmission signal frequency includes synchronising the local oscillators by a voltage controlled oscillator.

5. The retransmission process according to claim 1, wherein the digital signal is received by cable and retransmitted by a retransmission antenna.

6. A retransmission device for retransmitting a digital signal comprising:
   an input terminal for receiving the digital signal and the signaling information of the digital signal;
   a retransmission antenna for retransmitting the digital signal at a retransmission frequency;

a processor configured to select the retransmission frequency based on the received signaling information;

a set of local oscillators and at least one mixer for transposing the digital signal into a transposed digital signal to be retransmitted at the selected retransmission frequency; and a control circuit for controlling and adjusting the retransmission frequency of the transposed digital signal to be retransmitted based on the retransmission frequency of the transposed digital signal with respect to the selected retransmission frequency.

7. The retransmission device according to claim 6, wherein the set of local oscillators comprises a plurality of local oscillators and an additional local oscillator provided with a switch for connecting the additional local oscillator to the mixer in the case wherein the retransmission frequency of the transposed digital signal does not match the selected retransmission frequency.

8. The retransmission device according to claim 7, wherein the control circuit comprises a local reference oscillator to synchronize the plurality of local oscillators.

9. The retransmission device according to claim 6, comprising a radio relay channel for retransmitting to the retransmission antenna the digital signal received by cable.

10. The retransmission device according to claim 8, wherein the control circuit comprises a coupler to sample the transposed signal to be retransmitted, a comparator to perform a comparison between the measured frequency of the transposed signal to be retransmitted and the selected retransmission frequency to control the local reference oscillator to synchronize the plurality of local oscillators.

\* \* \* \* \*